US008891499B2

(12) United States Patent
Hassan et al.

(10) Patent No.: US 8,891,499 B2
(45) Date of Patent: Nov. 18, 2014

(54) COMPUTER RADIO WITH PRE-DEFINED CONFIGURATION SET

(75) Inventors: Amer A. Hassan, Kirkland, WA (US); Adam Sapek, Redmond, WA (US); Hui Shen, Sammamish, WA (US); Thomas W. Kuehnel, Seattle, WA (US); Deyun Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 11/956,469

(22) Filed: Dec. 14, 2007

(65) Prior Publication Data

US 2009/0154432 A1 Jun. 18, 2009

(51) Int. Cl.
  *H04W 4/00* (2009.01)
  *H04J 3/06* (2006.01)
  *H04W 28/18* (2009.01)
  *H04W 36/26* (2009.01)
  *H04W 8/24* (2009.01)

(52) U.S. Cl.
  CPC .............. *H04W 28/18* (2013.01); *H04W 36/26* (2013.01); *H04W 8/245* (2013.01)
  USPC ............................ 370/338; 370/331; 370/519

(58) Field of Classification Search
  CPC ............................... H04L 12/28; H04W 28/18
  USPC .......................................... 370/338, 331, 519
  See application file for complete search history.

(56) References Cited

U.S. PATENT DOCUMENTS

| 7,043,023 | B2 | 5/2006 | Watanabe et al. |
| 7,054,924 | B1 * | 5/2006 | Harvey et al. ................. 709/220 |
| 7,110,752 | B2 | 9/2006 | Okajima |
| 7,151,925 | B2 | 12/2006 | Ting et al. |
| 2004/0029575 | A1 | 2/2004 | Mehta |
| 2005/0027789 | A1 | 2/2005 | Luo et al. |
| 2005/0113093 | A1 * | 5/2005 | Mohebbi ........................ 455/436 |
| 2005/0221858 | A1 * | 10/2005 | Hoddie .......................... 455/557 |

(Continued)

FOREIGN PATENT DOCUMENTS

| CN | 1342359 A | 3/2002 |
| CN | 1514560 A | 7/2004 |

(Continued)

OTHER PUBLICATIONS

Written Opinion and International Search Report from PCT Application PCT/US2008/083878, dated Jun. 26, 2009.
Youngblood, G., "A Software-Defined Radio for the Masses, Part 1," http://www.ece.jhu.edu/~cooper/SWRadio/Yblood1.pdf, Jul./Aug. 2002, pp. 1-9.

(Continued)

*Primary Examiner* — Noel Beharry
*Assistant Examiner* — Farhad Ali
(74) *Attorney, Agent, or Firm* — John Jardine; Kate Drakos; Micky Minhas

(57) ABSTRACT

A computer with a software defined radio that can be configured based on a wireless technology specification. The computer may negotiate with a second computer that also includes a software defined radio to define a set of wireless technology specifications and trigger events indicating when each of the wireless technology specifications is to be used. As the computers communicate, if a trigger event occurs, both computers may reconfigure their software defined radios using a different specification in the set. By appropriately defining the wireless technology specifications in the set and the trigger events, the computers can operate with configurations that allow communication despite events that might otherwise disrupt communication between the computers.

17 Claims, 9 Drawing Sheets

(56) References Cited

U.S. PATENT DOCUMENTS

| | | |
|---|---|---|
| 2006/0046716 A1 | 3/2006 | Hofstaedter et al. |
| 2006/0079178 A1 * | 4/2006 | Palin et al. .................. 455/41.2 |
| 2006/0154691 A1 | 7/2006 | Tang et al. |
| 2006/0193295 A1 | 8/2006 | White et al. |
| 2006/0211387 A1 | 9/2006 | Pisek et al. |
| 2006/0287001 A1 | 12/2006 | Budampati et al. |
| 2007/0078924 A1 | 4/2007 | Hassan et al. |

FOREIGN PATENT DOCUMENTS

| | | | |
|---|---|---|---|
| EP | 1041771 A1 * | 10/2000 | |
| EP | 1161042 A1 | 12/2001 | |
| EP | 1553715 A1 | 7/2005 | |
| EP | 1583256 A1 | 10/2005 | |
| KR | 10-2006-0005599 A1 | 1/2006 | |
| WO | WO 03065654 A1 * | 8/2003 | ............. H04L 12/28 |
| WO | WO2004/015901 A1 | 2/2004 | |
| WO | WO 2006045345 A2 * | 5/2006 | |

OTHER PUBLICATIONS

"Software Defined Radio", http://www.altera.com/end-markets/wireless/software/sdr/wir-sdr.html, 4 pgs.

"Software Defined Radio," http://www.altera.com/end-markets/wireless/software/sdr/wir-sdr.html, 1 pg.

"Software defined radio " http://www.wipro.com/webpages/insights/softwareradio.htm, 1 pg.

Chinese Decision on Rejection from CN App. No. 200880121292.7; Dispatched on Mar. 27, 2013; 9 pages including partial translation.

Chinese Office Action from CN App. No. 200880121292.7; Dispatched on Aug. 31, 2012; 13 pages including partial translation.

Chinese Office Action from CN App. No. 200880121292.7; Dispatched on Nov. 21, 2012; 12 pages including partial translation.

"Notice of Allowance Received for China Application No. 200880121292.7", Mailed Date: Oct. 10, 2013, Filed Date: Nov. 18, 2008, 6 Pages.

* cited by examiner

COMPUTER RADIO WITH PRE-DEFINED CONFIGURATION SET

BACKGROUND

Many computing devices are equipped with hardware that allows the computing device to wirelessly connect to a network or to other computing devices. Such wireless hardware frequently contains one or more radios, each with a transmitter, a receiver and data processing components.

In some devices, the wireless hardware has a predefined configuration such that each radio supports a connection according to a specific wireless technology, such as Wi-Fi, WiMAX, Bluetooth or HSDPA. For example, such a radio may communicate using a predefined frequency or frequencies and use a predefined sequence of control messages to connect with another device or exchange information. To support communication with different devices communicating using different wireless technologies, the wireless hardware may include multiple radios, each configured for communication using a specific wireless technology. Though some radios may support a number of closely related wireless technologies, such as variations of the 802.11 Standard, a radio with a predefined configuration is generally limited in the wireless technologies it can support.

In other devices, the wireless hardware may be configurable such that the wireless technology used for communication may change under software control, implementing what is sometimes called a "software defined radio." The wireless hardware is adapted to receive control inputs that can change operating parameters of the radio, such as the frequencies used for communication or data processing performed on received signals. By reconfiguring the operating parameters of the hardware, it may be possible for one group of hardware components to act as a radio for different wireless technologies.

Configurability of a radio, even limited configurability, allows the radio to adapt to conditions affecting communication. For example, a radio may adapt to a low signal to noise ratio by decreasing a bit rate or increasing transmitted signal power.

SUMMARY OF INVENTION

To facilitate wireless communications, computers with configurable radios may be programmed with a set of configurations. Through a negotiation process, two computers that will communicate wirelessly may develop a common set of configurations and trigger events associated with the configurations. As the computers communicate, each may identify trigger events and reconfigure. Because the computers share a common set of configurations and trigger events, they will have compatible configurations as their radios are reconfigured.

To allow communicating computers to adapt to problems in wireless communication, each trigger event may be associated with a problem. The configuration associated with each trigger event may be defined to allow wireless communication despite the problem. Thus, the computers may adapt to problems experienced while communicating.

The configurations in the set may configure a computer for operation in accordance with different operating parameters for the same wireless technology or may configure the computers for operation with different wireless technologies. For example, configurations of the set may configure a computer to operate according to one wireless technology, but with different power levels or different data rates. Yet other configurations of the set may configure a computer to operate according to different wireless technologies, such as those that operate using different frequency channels. As a result, in response to a detected problem, a computer can adapt within a wireless technology by using the same wireless technology at a higher power level or lower data rate or may adapt by switching between wireless technologies, using a wireless technology that operates over a channel supporting more reliable communication.

In accordance with one aspect of the invention, the configurable radio may be modular. As a result of the modularity, the interface between the configurable radio and application components that generate or consume data transmitted wirelessly may remain unchanged, even though other portions of the configurable radio are reconfigured to adapt to communication problems. Thus, connections established between applications may be unaffected by changes in the configuration of the radios that convey the data for those connections.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that wireless communications between computers may be improved through the use of configurable radios for which configurations may be stored. The computers may have access to compatible sets of configurations that may be applied to the radios linked for wireless communication. In conjunction with the sets of configurations, information defining conditions under which each configuration is to be used may be stored. This information may be stored as a description of trigger events that, when detected, cause each computer to reconfigure its radio.

The compatible sets of configurations may be made available to the computers in any suitable way. However, in some embodiments of the invention, computers that are to communicate wirelessly may negotiate as part of developing a wireless link one or more sets of configurations and the information defining conditions under which each configuration in a set is to be used.

The negotiation may follow any suitable protocol. For example, negotiation may involve a mutual exchange of information defining the sets or a one-way exchange of information, with one computer defining configuration sets for all computers. In other embodiments, negotiations may involve all communicating computers accessing an external source, such as a server, to obtain the configuration.

In exemplary embodiments described below, a configurable radio is implemented as a software defined radio that has separate data and control planes. Through operations performed in the control plane, the data plane is reconfigured to change the operations performed on transmitted or received data. Such a software defined radio may include a store of wireless technology specifications, each of which can be used by the control plane to configure the data plane for operation in accordance with a specific wireless technology specification. Reconfiguration of the radio may be performed simply by applying a different wireless technology specification from the store. The control plane of such a software defined radio may include a module that receives and analyzes status information about ongoing communication and/or operating state of components of the computer. This component may identify operating conditions under which a change of configuration is to be made.

Figure 1:
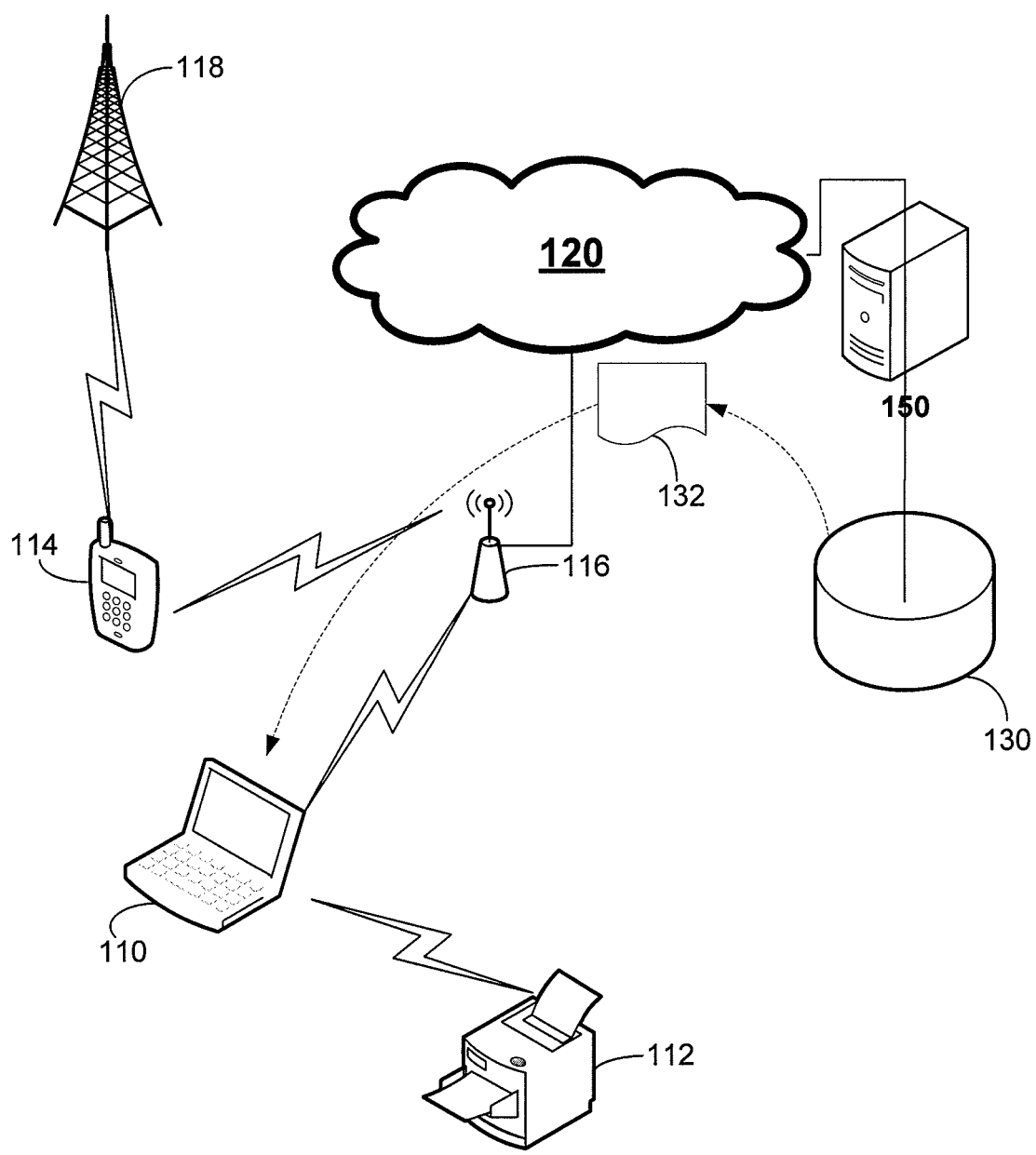
FIG. 1 is a sketch of a computing environment including a computing device with a software defined radio according to an embodiment of the invention.

An example of an environment in which such a software defined radio may be employed is provided by FIG. 1. FIG. 1 illustrates a networked computing environment in which multiple computing devices interact. One or more of the computing devices may contain a software defined radio according to embodiments of the invention. In the example illustrated, three computing devices communicating wirelessly as shown: laptop 110, printer 112, and Smartphone 114. Though three computing devices are illustrated, any number or type of computing devices may employ a software defined radio according to embodiments of the invention and three devices are illustrated for simplicity.

In this example, laptop computer 110 communicates wirelessly with an access point 116. Through access point 116, laptop computer 110 may gain access to network 120 and one or more devices connected to network 120. As an example of the types of devices that laptop computer 110 can access through network 120, FIG. 1 shows a server 150. In this example, server 150 may be a group policy server. As is known in the art, a group policy server may be configured to provide management information to clients that are domain joined. A group policy server provides a mechanism for a network administrator to provide policy information to the domain joined clients. Such servers may be used in enterprise networks to allow a network administrator to configure or otherwise manage network clients. Network clients, such as laptop computer 110, may be configured with an agent that, upon connection to network 120, accesses group policy server 150 to obtain or update group policy information.

Group policy server 150 may maintain group policy information in any suitable fashion. In the example of FIG. 1, group policy information may be maintained in database 130. Database 130 may represent any suitable computer storage media accessible by group policy server 150. In the example of FIG. 1, database 130 may contain group policy information as is known in the art. Alternatively or additionally, database 130 may contain information useful for configuring a software defined radio within laptop computer 110. For example, database 130 may contain one or more wireless technology specifications that, when downloaded to laptop computer 110 and applied to a software defined radio within laptop computer 110, configure the software defined radio for communications according to a specific wireless technology.

For example, FIG. 1 illustrates a wireless technology specification 132 being downloaded from database 130 through server 150 to laptop computer 110. The downloaded wireless technology specification 132 may configure the software defined radio within laptop computer 110 to communicate according to any suitable wireless technology. Wireless technology specifications downloaded to laptop computer 110 may be applied to a software defined radio sequentially or in parallel to change the function of a software defined radio within laptop computer 110 to support different wireless technology at different times or to support multiple wireless technologies concurrently.

For example, in FIG. 1 laptop computer 110 is communicating wirelessly with access point 116. Such communications with an access point for an infrastructure network are frequently performed using a wireless technology according to the 802.11 protocol. However, a user of laptop computer 110 may wish to access devices that are not connected to the infrastructure network 120, such as printer 112. Printer 112 may not support communication according to the same wireless technology as access point 116. Frequently, devices such as printer 112 are configured for communications using an ad hoc network and may use a wireless technology such as Bluetooth. Accordingly, wireless technology specification 132 may be applied to the software defined radio within laptop computer 110 to configure the radio to additionally communicate with printer 112 using a different wireless technology than used for communication through access point 116.

Printer 112 may also include a software defined radio that may similarly be configured for communications with a laptop computer 110. Though, it is not necessary that devices with software defined radios communicate only with other devices with software defined radios and a radio in printer 112 may be implemented in any suitable way.

Other computing devices may, like laptop 110, include a software defined radio that may be configured through the application of a wireless technology specification. For example, Smartphone 114 is shown communicating wirelessly with access point 116. As described above, communication with access point 116 may be in accordance with a wireless technology, such as an 802.11 protocol. Smartphone 114 may alternatively communicate with a general packet radio service (GPRS) network 118 using a different wireless technology. To support communications using two wireless technologies as illustrated in FIG. 1, Smartphone 114 may be equipped with a software defined radio that is programmed with multiple wireless technology specifications simultaneously.

Each computing device programmed with wireless technology specifications may obtain those wireless technology specifications in any suitable way. FIG. 1 shows as an example that a wireless technology specification may be obtained by a computing device through group policy server 150. More generally, a wireless technology specification may be obtained on a transportable computer storage media (such as a CD), obtained from any suitable server or obtained from any other suitable source.

As one example of the flexibility provided by this capability, a wireless device may download a wireless technology specification over the Internet or other publicly available network. An operator of a server reachable through the Internet may provide wireless technology specifications for a fee or other commercial consideration. For example, an operator of GPRS network 118 may provide wireless technology specifications allowing computing devices to access GPRS network 118. If access to GPRS network 118 is provided only to users who subscribe to the network service for a fee, the operator of GPRS network 118 receives a commercial benefit by enabling more users to access GPRS network 118 and therefore subscribe to the services provided through GPRS network 118.

As another example, a business or other entity may operate a website through which users of computing devices with software defined radios may purchase or license for a period of time a wireless technology specification enabling communications according to specific wireless technologies. This capability could be useful, for example, to a computer user preparing to travel to a foreign country where a wireless technology for which that user's computer is not configured is in widespread use. Prior to traveling to that foreign country, the computer user may wish to download a wireless technology specification so that the user may communicate wirelessly with networks or other devices in that foreign country. In this scenario, the wireless technology specification may be supplied by a business for a fee. Alternatively or additionally, the wireless technology specification may be provided in conjunction with a subscription to a wireless network in the foreign country, which may entail payment of a fee. In this way, a user of a computing device equipped with the software defined radio may greatly benefit from the expanded geographic area over which their computing device may communicate wirelessly. The same benefit may be achieved even if the networks accessed using a downloaded wireless technology specification are not in a foreign country. Accordingly, in embodiments of the invention, a wireless technology specification may be downloaded from any suitable server or obtained from any other data source for use in communicating with any suitable wireless devices in any suitable locations.

Figure 2:
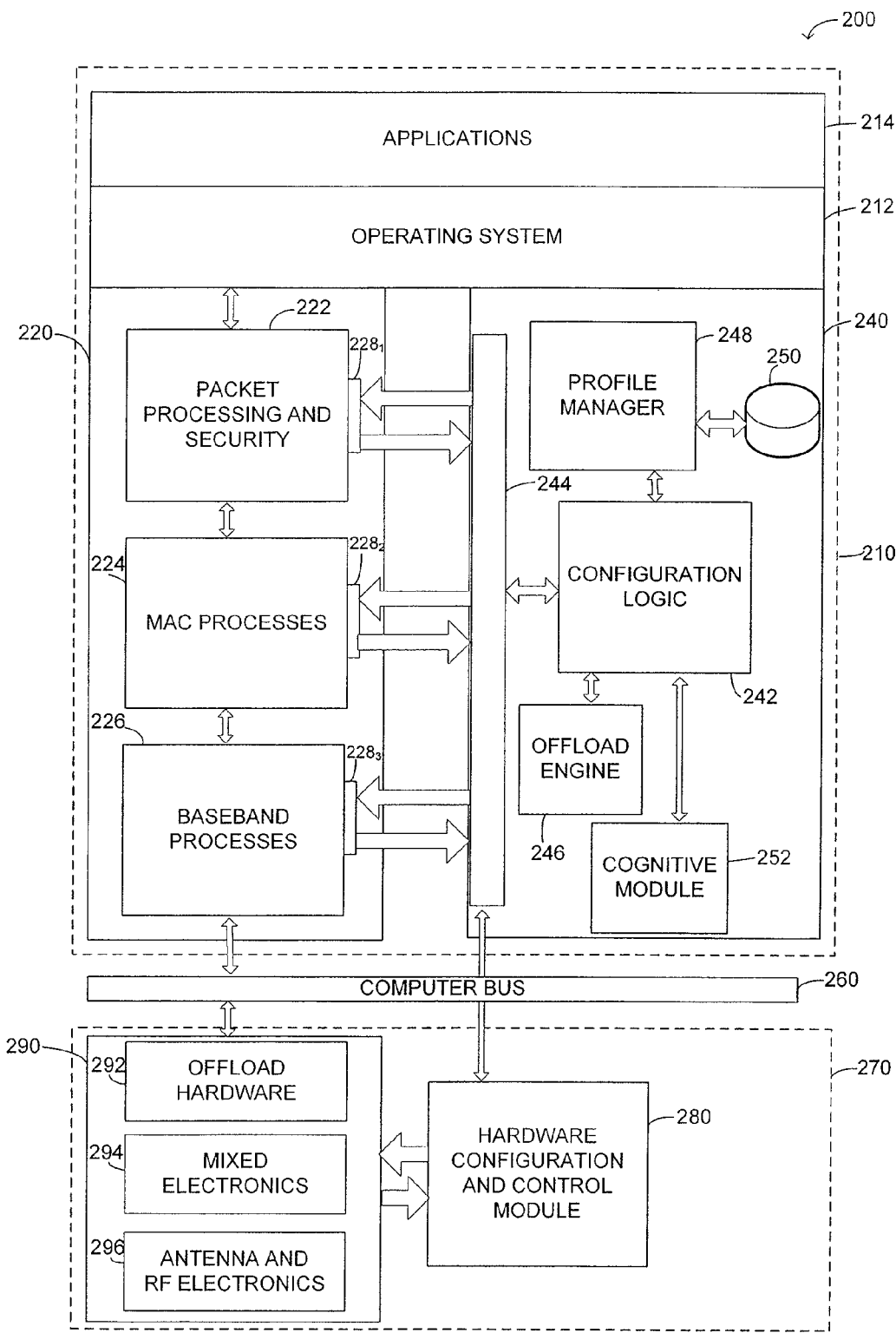
FIG. 2 is a block diagram of components within a computing device containing a software defined radio according to embodiments of the invention.

FIG. 2 illustrates an architecture of computing device 200 with a software defined radio that may be readily configured using a wireless technology specification, such as wireless technology specification 132 (FIG. 1). Such a computing device may be implemented using any suitable hardware. However, in the example of FIG. 2, computing device 200 includes a processor 210 coupled to a computer bus 260. Computer bus 260, for example, may be a PCI bus. However, any suitable bus may be used within computing device 200. Over computer bus 260, processor 210 may communicate with one or more other hardware components. In the example of FIG. 2, a radio card 270 is illustrated.

Processor 210 may be any suitable processor or processors and each processor may have one or multiple cores. However, for simplicity a single processor 210 is illustrated. Likewise, hardware components used in implementing a software defined radio may be packaged in any suitable way. For example, hardware components implementing a software defined radio may be implemented on a separate wireless network interface card or may be incorporated with hardware components performing other functions within computing device 200. As a further example of a possible variation, hardware components for implementing a software defined radio may be spread across multiple cards connected to computer bus 260. Accordingly, FIG. 2 shows an example embodiment in which a single radio card 270 incorporates all of the hardware components for a software defined radio, but any suitable packaging of the hardware components may be employed.

FIG. 2 also illustrates software components that may execute within computing device 200. In the embodiment illustrated, the software components may be stored as computer executable instructions and configuration parameters in computer storage media associated with processor 210. The software components may be configured in any suitable way. In the embodiment illustrated, the software components include an operating system 212. Operating system 212 may be a computer operating system as is known in the art, though any suitable operating system may be used. Operating system 212 may provide multiple functions accessed by applications 214 executing on computing device 200. The number and type of application components 214 may depend on the type and function of computing device 200. However, examples of applications 214 may include a web browser, email application or other applications that may generate or consume data that is transmitted or received wirelessly using a software defined radio.

Operating system 212 may provide an interface between applications 214 and the software defined radio. The operating system 212 may also provide higher level network functions than are provided by a radio. For example, a radio may provide network functions at levels 1 through 2 of the OSI layered network model. Operating system 212 may provide support for functions at higher network layers. In this scenario, the operating system may support connections between applications 214 and applications in other computing devices. For example, applications frequently communicate using a TCP protocol or other connection-based protocols. Operating system 212 may contain components that establish and maintain connections with applications in other devices, though relying on the software defined radio to physically convey data for that connection to the other device.

Such partitioning of functions between an operating system and a radio is known in the art, whether or not a software defined radio is employed. Accordingly, the specific partitioning of communication functions between operating system 212 and software defined radio within computing device 200 is not critical to the invention.

In the example of FIG. 2, a software defined radio is implemented with software components segregated into a data plane 220 and a control plane 240. Data or control messages related to specific wireless technologies generated by an application 214 or operating system 212 for transmission wirelessly passes through data plane 220 before it is applied to radio card 270 for transmission. The specific processing performed by the components within data plane 220 may be defined and configured by components within control plane 240. Data or control messages related to specific wireless technologies received wirelessly on radio card 270 may be passed through components of data plane 220 on its way to operating system 212 or to applications 214. The processing within data plane 220 performed on received data may likewise be defined and configured by components within control plane 240.

In the embodiment illustrated, the hardware components on radio card 270 may likewise be segregated into a control plane and a data plane. In the embodiment illustrated, data plane 290 is illustrated as containing multiple components. A hardware control plane within radio card 270 is implemented in a single module 280. However, the number and types of modules within each of the control and data planes are not critical to the invention.

In the embodiment illustrated, software data plane 220 includes a packet processing and security module 222, a media access control module (MAC) 224 and baseband processes module 226. The specific functions performed within each of these modules may depend on the configuration of the software defined radio. However, packet processing and security module 222, when processing for data to be transmitted, may receive the data from operating system 212 and format the data into packets in accordance with any protocols used by the wireless technology for which the software defined radio is configured to implement. As part of forming packets, packet processing module 222 may perform a packet level encryption, fragmentation, apply a signature to a packet for authentication or perform other security functions for the data to be transmitted wirelessly.

Components within MAC processes module 224 may perform one or more MAC functions as appropriate for the wireless technology for which the software defined radio is configured. For example, components within MAC processes module 224 may establish a channel over which computing device 200 may wirelessly communicate with another wireless device, determine when data may be transmitted over that channel or specific frequencies to be used for communication over that channel.

In addition to other functions, when processing data to be transmitted, components within MAC processes module 224 may receive packets defined within packet processing and security module 222 and convert each packet into a stream of source bits for transmission.

Those source bits may be provided to components within baseband processes module 226 for further processing and ultimately for application to hardware components on radio card 270 for wireless transmission. For example, a component within baseband processes module 226 may encode the source bits using a forward error correction algorithm. Another component may digitally modulate the encoded bit stream, such as by mapping groups of bits to symbols for transmission. An example of a modulation scheme that may be used is Quadrature Amplitude Modulation (QAM) using phase and, amplitude keying. However, the specific modulation functions employed may depend on the wireless technology implemented by the software defined radio. In addition, components within processes module 224 may also filter the modulated bit stream using one or more in digital filtering algorithms. As with the other components within baseband processes module 226, the specific function performed by filtering components may depend on the wireless technology to be implemented.

For transmission of data, data processing may also be performed by hardware components on radio card 270. Accordingly, hardware card 270 may include one or more hardware components within data plane 290. In the example of FIG. 2, hardware data plane 290 includes offload hardware module 292, mixed electronics module 294 and antenna and RF electronics 296. Each of the hardware modules may be implemented using known digital and/or analog electronic circuit components. The specific implementation of each of the hardware modules may depend on the range of wireless technologies supported by radio card 270. However, as an example, antenna and RF electronics module 296 may contain, to support transmitting data, a power amplifier and a frequency converter for performing a frequency up-conversion. The frequency range over which the up-converter operates may depend on the frequency range over which radio card 270 may operate.

In addition, antenna and RF electronics module 296 may contain one or more antennas coupled to the power amplifier.

In some embodiments, an antenna may be configurable for operation at different frequencies, with a specific configuration selected based on the wireless technology or technologies to be supported by the software defined radio. In other embodiments, antenna and RF electronics module 296 may contain multiple antennas that may be switchably connected to RF electronics components within module 296. In this embodiment, the antenna switched to the RF electronics may be selected to match the frequency of the signals to be transmitted. Such antennas may be implemented as patch antennas as is known in the art or in any other suitable way. In some embodiments, the antenna or antennas within antenna and RF electronics module 296 may be implemented on radio card 270. However, in some embodiments, the antennas may be positioned in any suitable location within computing device 200.

Mixed electronics module 294 may contain, for processing data to be transmitted, components that convert data generated by software processing into an analog signal for transmission by antenna and RF electronics module 296. For example, mixed electronics module 294 may contain a digital to analog converter as is known in the art. However, any suitable components may be used.

Offload hardware module 292 may contain hardware components that may perform some or all of the functions that may be performed within software data plane 220. Incorporation of offload hardware module 292 into radio card 270 provides an option for configuring a software defined radio to perform some functions either in software or in hardware. In the embodiment illustrated, offload hardware module 292 is an optional component on radio card 270. Accordingly, when configuring a software defined radio, if offload hardware module 292 is present and contains a component to perform a function that is used to implement a desired wireless technology, a component within offload hardware module 292 may be configured to perform that function. Alternatively, if offload hardware module 292 is not present or does not include a component to implement a function that is part of a desired wireless technology, that function may be implemented in software data plane 220.

Regardless of the specific components within each of the modules in software data plane 220 and hardware data plane 290, the collection of components implements the functions used for transmitting data according to a specific wireless technology. The components in software data plane 220 and hardware data plane 290 also collectively implement the functions for receiving data according to specified wireless technologies. Accordingly, antenna and RF electronics module 296 may contain one or more antennas to receive a wireless signal conveying that data. In some instances, the same components may be used for transmission and receipt of data. For example, antennas within antenna and RF electronics module 296 may be used for both transmission and reception of data. In other instances, separate components may be included for processing transmitted and received data. Antenna and RF electronics module 296 may include a low noise amplifier and a down converter for processing received data in addition to a power amplitude and up-converter for transmitting data. Mixed electronics module 294 may include an analog to digital converter for converting a received analog signal into a digital signal for further processing. Similarly, offload hardware module 292 may include components for performing functions on received data instead of or in addition to components for performing function on transmitted data.

Modules within software data plane 220 may likewise contain components for processing received data. For example, baseband processes module 226 may include a filter for operating on received data, which may be the same or different than the filter used for operating on transmitted data. Other components within baseband processes module 226 may demodulate received signals or decode demodulated signals. In some embodiments, the demodulation and decoding operations for received signals will be the inverse of the error correcting and modulation functions performed for transmitted data. However, the specific functions performed within each module may be configured according to a particular wireless technology to be implemented.

In the embodiment illustrated, a received signal, following processing within baseband processes module 226 may be provided to components within MAC processes module 224 for further processing. Those components may form a stream of bits output by baseband processes module 226 into packets or otherwise process the received data. In addition, components within MAC processes module 224 may acknowledge packets when received or otherwise perform a function to maintain communication according to a protocol applicable to a wireless technology implemented by the software defined radio.

Components within packet processing and security module 222 may also perform functions on received data. Those components may provide decryption or re-assembly functions that could be the inverse of the functions applied to transmitted data. In addition, components within packet processing and security module 222 may group packets or otherwise process them before notifying operating system 212 that packets have been received. Processing to notify packets to operating system 212 may be as is known in the art, though any suitable mechanism may be used and, as with other functions of the software defined radio, in some embodiments may be configurable.

To implement a software defined radio for a desired wireless technology or technologies, one or more of the hardware and software modules in the software data plane 220 and hardware data plane 290 may be configured. In the embodiment illustrated, components within the software data plane 220 are configured by components within control plane 240. In the embodiment illustrated, software control plane 240 includes a radio configuration and control module 244 that provides an interface to each of the configurable components within software data plane 220.

The specific mechanism by which radio configuration and control module 244 interacts with configurable components within software data plane 220 is not critical to the invention and any suitable mechanism may be used. However, in the embodiment illustrated, each of the modules 222, 224 and 226 includes a defined programming interface $228_1$, $228_2$, and $228_3$, respectively. Each of the interfaces $228_1$, $228_2$, and $228_3$ may be in a form that is published or otherwise made known to parties wishing to develop software components for use in a software defined radio. In this way, regardless of which components are included within data plane 220, radio configuration and control module 244 may interface with those components.

Though the specific format of the interface is not critical to the invention, in the embodiment illustrated, interfaces $228_1$, $228_2$, and $228_3$ allow for a two-way exchange of information, allowing status and control information to pass through the interface. Each of the components in software data plane 220 may, through an interface such as $228_1$, $228_2$, or $228_3$, provide status information, defining its operational status as well as its operational capabilities. For example, components within packet processing and security module 222 may communicate to radio configuration and control module 244 through interface $228_1$ specific security functions that they can support. Interface $228_1$ may also allow radio configuration and control module 244 to control which of those functions should be performed on packets to be transmitted or on received packets. Similarly, interface $228_2$ may allow components within MAC processes module 224 to identify the functions they can perform and to allow radio configuration and control module 244 to configure those components to perform functions used in implementing a desired wireless technology. A similar two-way exchange of information may occur through interface $228_3$, allowing radio configuration and control module 244 to determine functions supported by components within baseband processes module 226 and to specify a configuration for those components.

In the embodiment illustrated in FIG. 2, radio configuration and control module 244 also interfaces to hardware components on radio card 270. In the embodiment illustrated, hardware configuration and control module 280 serves as an interface between radio configuration and control module 244 and the hardware components in hardware data plane 290. The specific form of the interface between radio configuration and control module 244 and hardware configuration of control module 280 is not critical to the invention. However, in the illustrated example, the form of the interface is made known to the party implementing radio card 270 and is implemented over a standard computer bus. In this way, computing device 200 may be constructed using a radio card 270 from any suitable source electing to implement the interface to radio configuration and control module 244 using the format of bus 260.

Hardware configuration and control module 280 may be implemented using any suitable hardware components. For example, hardware configuration and control module 280 may be implemented as a gate array chip mounted to radio card 270. However, radio card 270 may be implemented using one or more application specific integrated circuits (ASIC), and hardware configuration and control module 280 may be implemented as one or more segments of such an ASIC.

Regardless of the specific implementation of hardware configuration and control module 280, in the embodiment illustrated, module 280 provides an interface to the hardware components in hardware data plane 290 that may be used either to configure the components or to obtain capability or other status information about those components. For example, hardware configuration and control module 280 may write values into control registers associated with hardware modules 292, 294 or 296. Conversely, hardware configuration and control module 280 may read status registers from those modules. Regardless of the specific interface mechanism between hardware configuration and control module 280 and the hardware components within hardware data plane 290, hardware configuration and control module 280 may provide to radio configuration and control module 244 the and status data obtained from the hardware components and may apply configurations to the hardware components as specified by radio configuration and control module 244.

In passing control and status information between radio configuration and control module 244 and hardware components within hardware data plane 290, hardware configuration and control module 280 may convert or otherwise process the information. As one example, mixed electronics module 294 may receive as a configuration input a specific digital code specifying an amount of frequency up-conversion to perform on a signal carrying transmitted data. Radio configuration and control module 244 may specify frequency up-conversion in a format different than that received by mixed electronics module 294. In that scenario, hardware configuration and control module 280 may be configured to receive a desired operating parameter for mixed electronics module 294 in a format generated by radio configuration and control module 244 and convert it into a format that can be applied by mixed electronics module 294 to achieve the desired amount of frequency up-conversion.

The specific functions that each of the components within hardware data plane 290 and software data plane 220 is configured to perform may depend on the overall configuration of the software defined radio. In the embodiment illustrated, the configuration was driven both by the wireless technology to be implemented by the radio and, if the wireless technology has variable parameters of operation, the specific parameters of operation selected for implementation at any given time. For example, a radio supporting Wi-Fi may be configured differently than a radio supporting a different technology, such as Wi-MAX. In addition, some wireless technologies, such as Wi-Fi, support different modulations (e.g., 802.11a versus 802.11b/g) or have other parameters that may be varied in use. One or more of the components implementing a software defined radio may be configured differently, depending on the data rate or values of other parameters to be supported for Wi-Fi communications.

Control plane 240 may contain one or more components to determine, based on a desired wireless technology and parameters of that wireless technology at any time, the specific configuration of the software defined radio. In the embodiment illustrated in FIG. 2, configuration logic module 242 performs that function. The specific implementation of configuration logic module 242 is not critical to the invention. As an example, configuration logic module 242 may be implemented as a rules engine, applying a set of rules to determine a specific configuration for each of the components in software data plane 220 and hardware data plane 290 at any given time based on one or more inputs received from a user or other components within computing device 200 and information on operating conditions. However, the specific implementation of configuration logic module 242 is not critical to the invention and any suitable implementation may be used.

Regardless of the specific implementation of configuration logic module 242, module 242 may receive one or more types of inputs used in determining a desired configuration for the hardware and software components of the software defined radio at any given time. In the embodiment of FIG. 2, inputs are provided to configuration logic module 242 from a cognitive module 252, an offload engine 246, and profile manager 248.

In the embodiment illustrated, profile manager module 248 provides to configuration logic module 242 the specification of a wireless technology to be implemented by the software defined radio. The specification may define the functions to be collectively implemented by components within software data plane 220 and hardware data plane 290. Those functions may be specified in any suitable way. For example, the functions may be specified by indicating operating parameters of one or more components within software data plane 220 and hardware data plane 290. Alternatively or additionally, the specification may include executable code that may be added as a component to one or more of the modules within software data plane 220.

Profile manager module 248 may obtain specifications of wireless technologies in any suitable way. In the embodiment illustrated, control plane 240 includes a profile store 250 containing one or more wireless technology specifications. Profile store 250 may be implemented in computer storage media associated with computing device 200. As described in connection with FIG. 1, specifications for wireless technologies, such as specification 132 (FIG. 1) may be downloaded over a network from a server or other suitable source. However, the source of wireless technology specifications in profile store 250 and the specific implementation of profile store 250 are not critical to the invention and any suitable mechanisms may be used to obtain wireless technology specifications and selecting one or more specifications for use at any given time.

In addition to providing wireless technology specifications to configuration logic module 242, profile manager module 248 may provide input to configuration logic module 242 indicating which wireless technologies to be implemented by a software defined radio at any time. Profile manager module 248 may provide indications of wireless technologies to implement based on input received from one or more sources. For example, profile manager module 248 may include a user interface, allowing a user to select a wireless technology for implementation by a software defined radio. Similar input may be received alternatively or additionally from operating system 212, applications 214, a group policy store on computer 200 that was downloaded from a group policy server or any other suitable source.

Configuration logic module 242 may also receive input concerning a desired configuration of components within software data plane 220 and hardware data plane 290 from offload engine module 246. As indicated in FIG. 2, radio card 270 may include offload hardware module 292. When present, offload hardware module 292 may perform functions that could also be performed by software components within software data plane 220. Offload engine module 246 receives and analyzes capability information output by offload hardware module 292. Using this capability information, offload engine module 246 may analyze a wireless technology specification to determine whether any of the functions needed to implement the wireless technology specification may be performed in offload hardware module 292. If offload hardware module 292 supports any of the needed functions, offload engine module 246 may provide an indication to configuration logic module 242 that certain functions may be allocated to offload hardware module 292. In response, configuration logic module 242 may generate appropriate configuration commands, causing those functions to be implemented by components within offload hardware module 292.

In some embodiments, offload engine module 246 may perform additional processing before indicating to configuration logic module 242 that hardware components are available to perform certain data processing functions. For example, hardware within computing system 200 may be limited in one or more ways and overall operation of computing system 200 may, in some instances, be optimized by configuring software components to perform data processing functions even if offload hardware module 292 contains components that could perform the same functions.

Offload engine module 246 may be implemented in any suitable way. For example, offload engine module 246 may be implemented using rule-based technology.

In addition, configuration logic module 242 may receive input from cognitive module 252 that configuration logic module 242 may use in configuring hardware and/or software components of the software defined radio. In the embodiment illustrated, cognitive module 252 receives status information concerning operation of the hardware and/or software components implementing a software defined radio. Based on the status information, cognitive module 252 may perform processing to recognize that an adaptation is required in the configuration of the software defined radio. In some embodiments, the adaptation may involve modifying an operating parameter within a wireless technology.

For example, many wireless technologies support operation at multiple frequencies. Status information output by one or more of the components may allow cognitive module 252 to identify that a different channel should be used. For example, a received signal output by a component within antenna and RF electronics module 296 may indicate that certain frequencies are less utilized or have less interference than frequencies currently in use by the software defined radio. In this scenario, cognitive module 252 may report to configuration logic module 242 that a different frequency would provide more reliable communication and configuration logic module 242 may generate configuration commands to one or more of the hardware or software components in the software defined radio to change the frequency.

Alternatively or additionally, cognitive module 252 may identify conditions requiring other adaptations within a wireless technology. For example, cognitive module 252 may identify that either a lower or higher transmit power level is desirable. In response, configuration logic module 242 may generate commands configuring a power amplifier within antenna and RF electronics module 296 to transmit at a different power level.

More generally, cognitive module 252 may collect status information from any component within software data plane 220 or hardware data plane 290 and perform processing on the status information to identify a condition with ongoing communications that warrants an adaptation. In many instances, the status information will relate to communications, such as measured errors or an amount of data to be transmitted. However, the status information used by cognitive module 252 need not be so limited. The status information may include battery life or other information about computing device 200 or any other available information useful in selecting or setting parameters of a wireless technology.

The adaptation may be implemented by configuration logic module 242 issuing commands that reconfigure one or more of the components in either software data plane 220 or hardware data plane 290 to cause the adaptation without charging the wireless technology implemented by the software defined radio.

Cognitive module 252 is not limited to identifying adaptations within the same wireless technology. In some embodiments, cognitive module 252 may be configured to recognize that more efficient communications may be achieved by communicating using a different wireless technology. In such an embodiment, configuration logic module 242 may obtain from profile manager module 248 a specification for a different wireless technology. Configuration logic module 242 may then generate configuration commands to reconfigure the software defined radio to communicate using a different wireless technology. In this way, computing device 200 may be flexibly controlled to implement efficient communication by adapting within a wireless technology or across wireless technologies.

Figure 3:
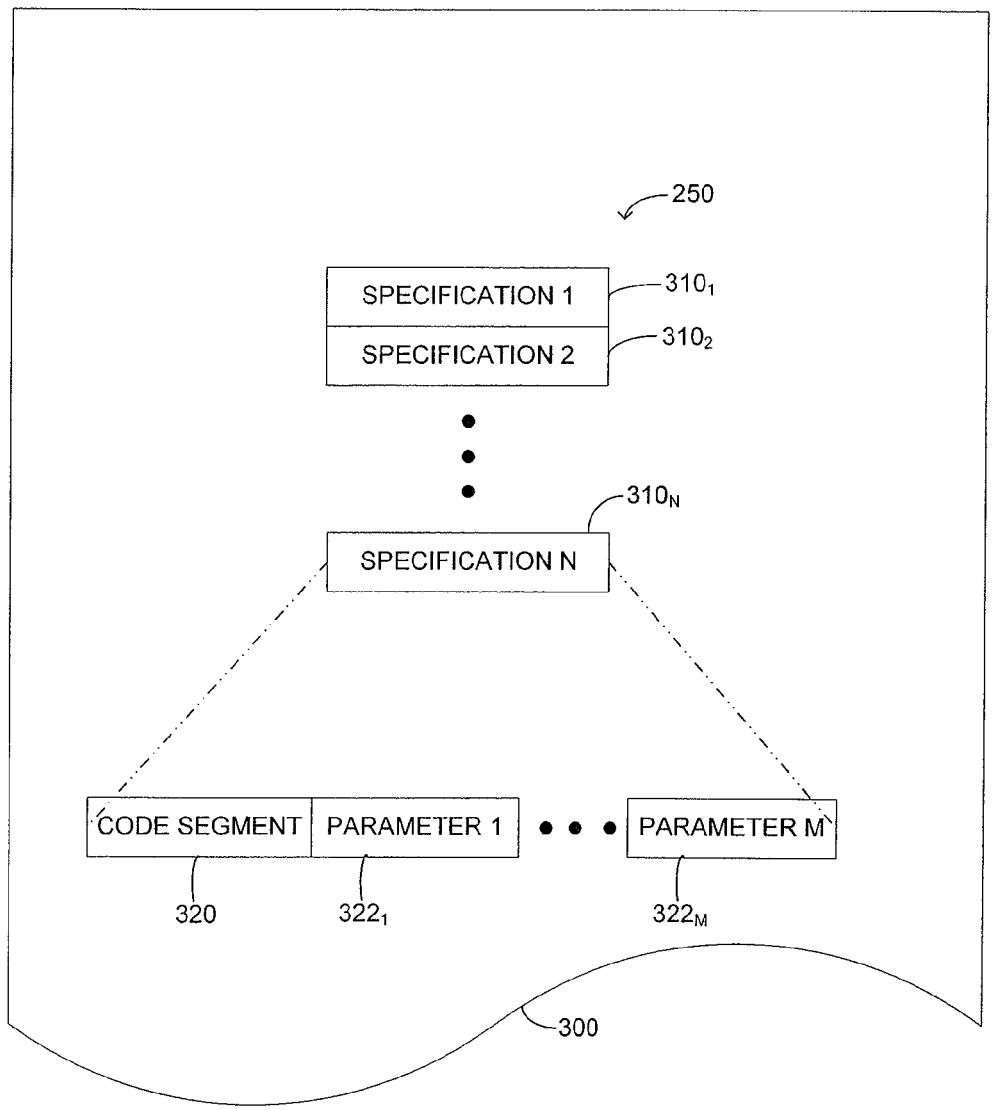
FIG. 3 is a sketch of data structure for a library of wireless technology specifications according an embodiment of the invention.

If an adaptation to a different wireless technology is desired, profile manager 248 may obtain a wireless technology specification from profile store 250 and provide the specification to configuration logic 242. Specifications may be stored in profile store 250 in any suitable way. FIG. 3 illustrates as one example, a possible implementation of profile store 250.

As illustrated in FIG. 3, profile store 250 may be implemented in any suitable computer storage media. For example, data defining one or more specifications may be recorded on computer storage media 300. In the example illustrated, records $310_1$, $310_2$, ... $310_N$ are shown, each storing information defining a specification for a wireless technology.

The specific format in which information defining a wireless technology is stored within each of the records $310_1$ ... $310_N$ is not critical to the invention. However, an exemplary structure for record $310_N$ is shown. In the example of FIG. 3, record $310_N$ contains multiple fields, each field defining information used in configuring the software defined radio. In this example, each record contains two types of fields. One type of field, represented by field 320, contains information identifying executable code. The executable code identified in field 320 may be a component or components of any of the modules within software data plane 220 (FIG. 2). Executable code may be identified in field 320 in any suitable way. For example, computer executable instructions may be stored as part of record $310_N$. As another example, field 320 may include a list of executable components stored elsewhere within computing device 200 (FIG. 2). As a further example of a possible implementation, field 320 may store one or more links to storage locations outside of computing device 200 from which executable components may be obtained.

In addition, record $310_N$ is shown to contain multiple fields, represented by fields $322_1$ ... $322_M$, that store parameters for configuring hardware or software components in hardware data plane 290 or software data plane 220 (FIG. 2). The information in fields $322_1$ ... $322_M$ may be stored in any suitable form, which may depend on the specific hardware or software components to which the values in fields $322_1$ ... $322_M$ are to be applied.

Figure 4:
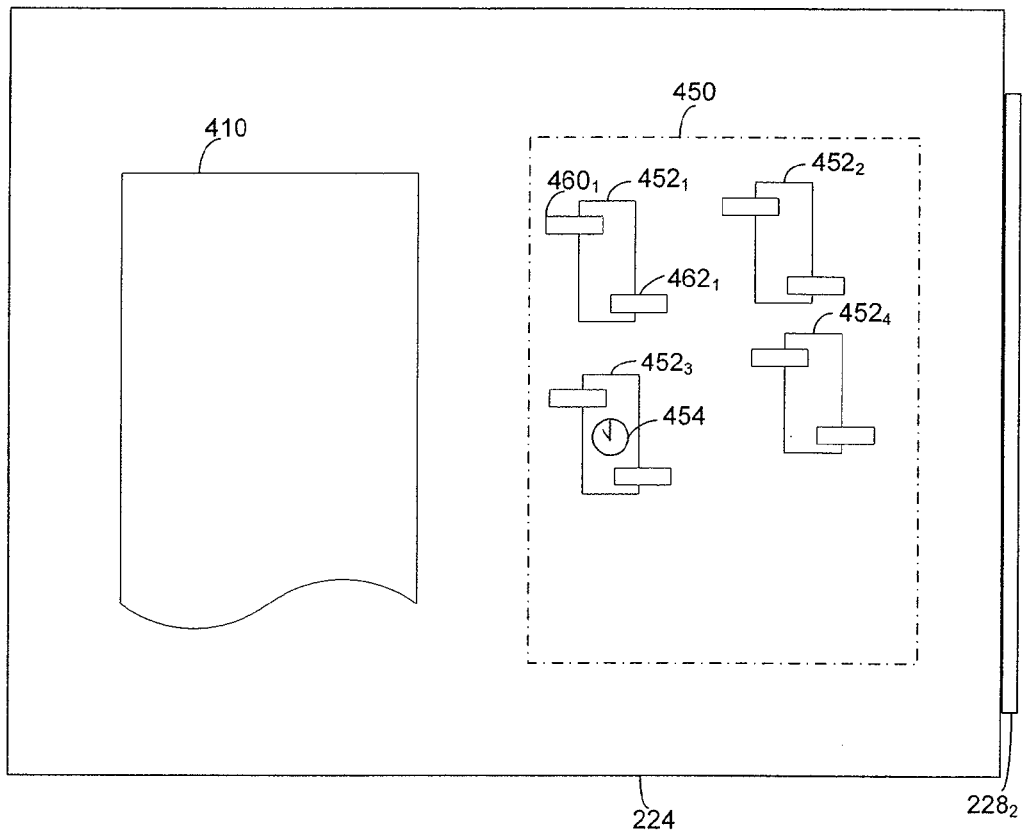
FIG. 4 is a sketch of a software module of a software defined radio according to an embodiment of the invention.

With a wireless technology specification in the form illustrated in FIG. 3, components within control plane 240 may configure a software defined radio by providing executable components and/or specifying values of operating parameters of those components. FIG. 4 illustrates an example module within a software defined radio that has been configured by application of one or more specifications in the form illustrated in FIG. 3.

FIG. 4 shows as an example of a module within software data plane 220 MAC processes module 224. However, in some embodiments, each of the modules within software data plane 220 may have an architecture generally as illustrated in FIG. 4.

FIG. 4 shows that MAC processes module 224 includes an interface $228_2$ through which radio configuration and control module 244, or any other suitable component, may configure the module. Through interface $228_2$, executable components may be added to module 224. In the operating state depicted in FIG. 4, executable components $452_1$, $452_2$, $452_3$ and $454_4$ have been added.

Each of the components $452_1$ ... $452_4$ may represent a programming object or component in any other suitable form. Each of the components $452_1$ ... $452_4$ may perform one or more of the functions performed within module 224. In the example in which module 224 performs MAC processes, each of the components within component group 450 may perform a function associated with MAC processes, such as responding to a control packet or grouping received packets that have been fragmented. However, the specific number and function of components within component group 450 may depend on the function of module 224 and the wireless technology or technologies for which the software defined radio has been configured.

Though the specific format in which components $452_1$ ... $452_4$ are implemented is not critical to the invention, the example embodiment shows that each of the components may have the same general format. In the embodiment illustrated, each of the components within component group 450 is implemented as a "plug in." When implemented as a plug in, each of the components $452_1 \ldots 452_4$ includes one or more interfaces in a defined format, allowing other components of computing system 200 to interact with the components. In this way, components may be readily added to component group 450 as new functions to be implemented by software defined radio are identified.

As one example, wireless technology protocols frequently undergo multiple revisions. It may be desirable, for each revision, to generate one or more components that perform functions necessary to implement the revised protocol. With the flexibility provided by the architecture of FIG. 4, a computing device 200 may be readily configured to operate according to a modified protocol, even though not specifically designed for that protocol.

To support operation as a plug in, each of the components within component group 450 may implement one or more defined interfaces. In the embodiment illustrated, each of the components within component group 450 implements two interfaces. Taking component $452_1$ as illustrative, an interface $460_1$ and an interface $462_1$ are shown. Interface $460_1$ may be a data interface and interface $462_1$ may be a control interface. Through interface $460_1$, other components within computing device 200 may supply data to component $452_1$ for processing. Alternatively or additionally, other components within computing device 200 may obtain data processed by component $452_1$ through interface $460_1$. Depending on the type and nature of component $452_1$, operating system 212, other components within module 224 or within other modules may exchange data with component $452_1$ through interface $460_1$.

Component $452_1$ is also shown to contain control interface $462_1$. In the embodiment of FIG. 2, radio configuration and control logic 244 may receive status information from component $452_1$ and provide control information to component $252_1$ through interface $462_1$. For example, through interface $462_1$, component $452_1$ may receive values of parameters specifying one or more aspects of the operation of component $452_1$. Alternatively or additionally, component $452_1$ may use interface $462_1$ to provide status information.

In some embodiments, all of the functionality within module 224 may be implemented by components within component group 450. However, in some embodiments, module 224 may include one or more fixed components 410. The fixed components 410 may be present in module 224 regardless of the specific configuration of the radio at any given time. For example, fixed component 410 may coordinate operation of components within component group 450, facilitate interfacing between the components in component group 450 and other components of computing device 200 (FIG. 2) or perform functions that are performed by module 224 regardless of configuration.

FIG. 4 illustrates a further feature that may be implemented using the componentized architecture of FIG. 4. Some or all of the components may incorporate digital rights management to control some aspect of the usability of those components. In the example of FIG. 4, component $452_3$ is shown to include digital rights management, as illustrated symbolically by rights management element 454. Rights management element 454 may represent a cryptographic mechanism applied to component $452_3$ that precludes execution of component $452_3$ except under allowed conditions. The conditions under which execution of component $452_3$ are allowed may be defined as is known in the art of digital rights management or in any other suitable way. As one example, the conditions may be defined based on time. Rights management element 454 may preclude execution of component $452_3$ after a pre-defined time. With this capability, components that provide functions for a software defined radio may be "leased."

Alternatively, rights management element 454 may be used to control other conditions under which component $452_3$ is allowed to execute. For example, component $452_3$ may be allowed to execute only for so long as the user of computing device 200 maintains a subscription to a network or other service.

Figure 5A:
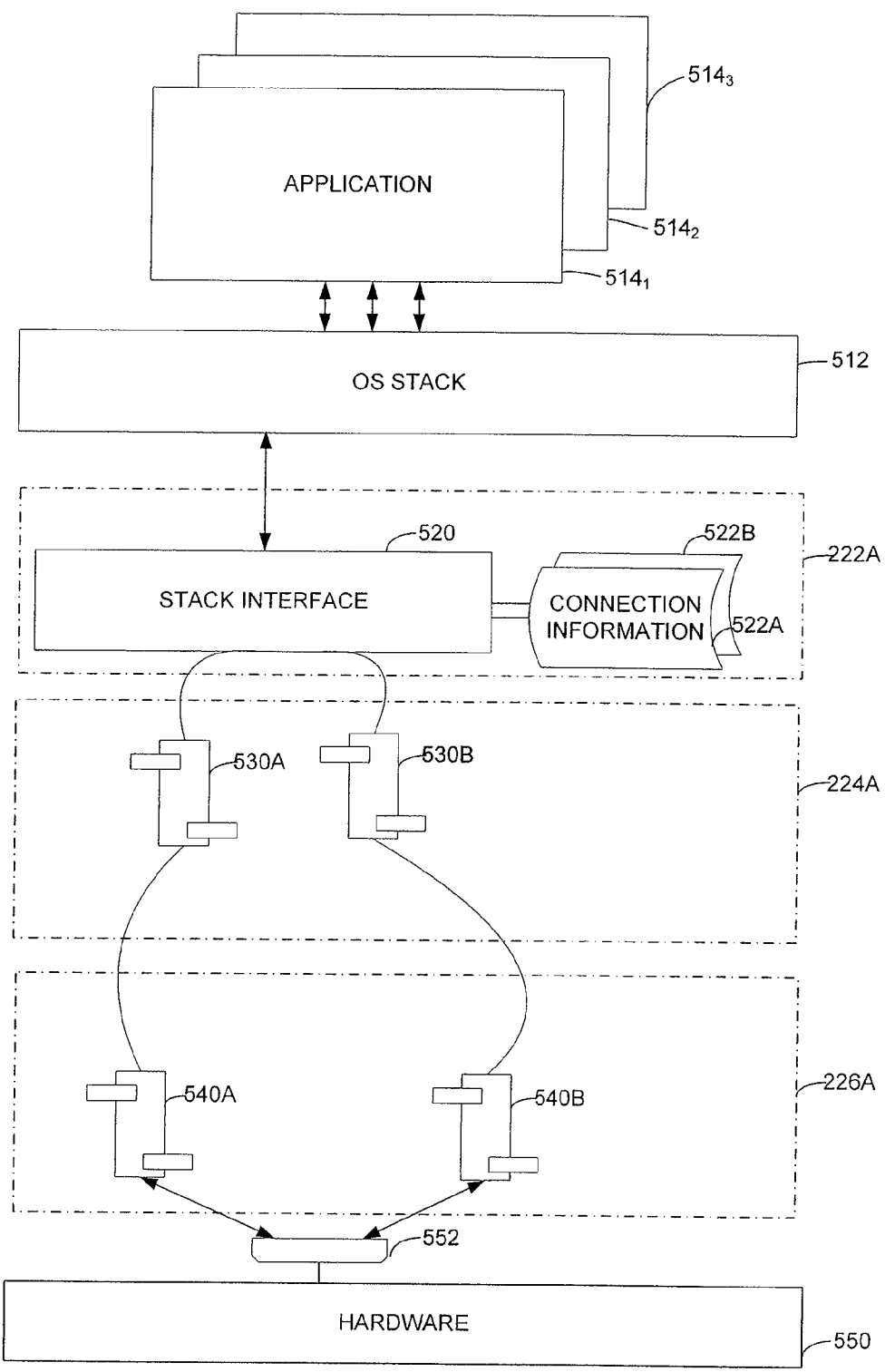
FIG. 5A is a sketch of a computing device incorporating a software defined radio in a first configuration according to an embodiment of the invention.

Turning to FIG. 5A, a further example is provided of a function that may be implemented with the software defined radio using an architecture according to embodiments of the invention. FIG. 5A illustrates that a software defined radio may be configured to support communications using multiple wireless technologies concurrently. Multiple wireless technologies may be supported concurrently by configuring modules of the software defined radio to implement all functions collectively performed by all of the multiple wireless technologies to be implemented.

In the example of FIG. 5A, one or more applications $514_1$, $514_2$ and $514_3$ generate and/or consume data for wireless communications. Applications $514_1 \ldots 514_3$ may interface with a software defined radio through an operating system stack 512, using a stack mechanism as is known in the art. However, in the example of FIG. 5A, application $514_1$ may communicate using a different wireless technology than application $514_3$.

The operating system stack 512 may interface with the software defined radio using any suitable interface. However, a conventional stack interface may be employed. Accordingly, packet processing and security module 222 is shown to have a stack interface 520, which may be implemented as is known in the art. However, to the extent packet processing and security module 222 stores different types of connection information for connections using different wireless technologies, two components may be included within packet processing and security module 222 to store connection information for the wireless technologies used by applications $514_1$ and $514_3$. Accordingly, FIG. 5A illustrates components 522A and 552B storing connection information for two wireless technologies.

In addition, MAC processes module 224 may also contain components to implement two wireless technologies. In this example, component 530A is shown to implement the wireless technology used by application $514_1$ and component 530B is shown to implement the wireless technology used by application $514_3$.

Likewise, baseband processes module 226A is shown to contain components 540A and 540B, implementing functions for the wireless technology used by application $514_1$ and $514_3$, respectively.

In the embodiment illustrated, hardware 550 is shown to interface with both components 540A and 540B. Hardware 550 may contains sufficient components to support processing of data for two wireless technologies simultaneously. Multiplexing component 552 may be incorporated to provide the interface to hardware 550. Multiplexing component 552 may operate according to a time division multiplexed scheme in which, in some intervals, it passes data according to the wireless technology for application $514_1$ and in other intervals it passes data for the wireless technology used by application $514_3$. When time multiplexed, the operation of hardware 550 may switch between data processing for the different wireless technologies at a sufficiently high rate that the radio may be regarded as supporting both wireless technologies concurrently.

Figure 5B:
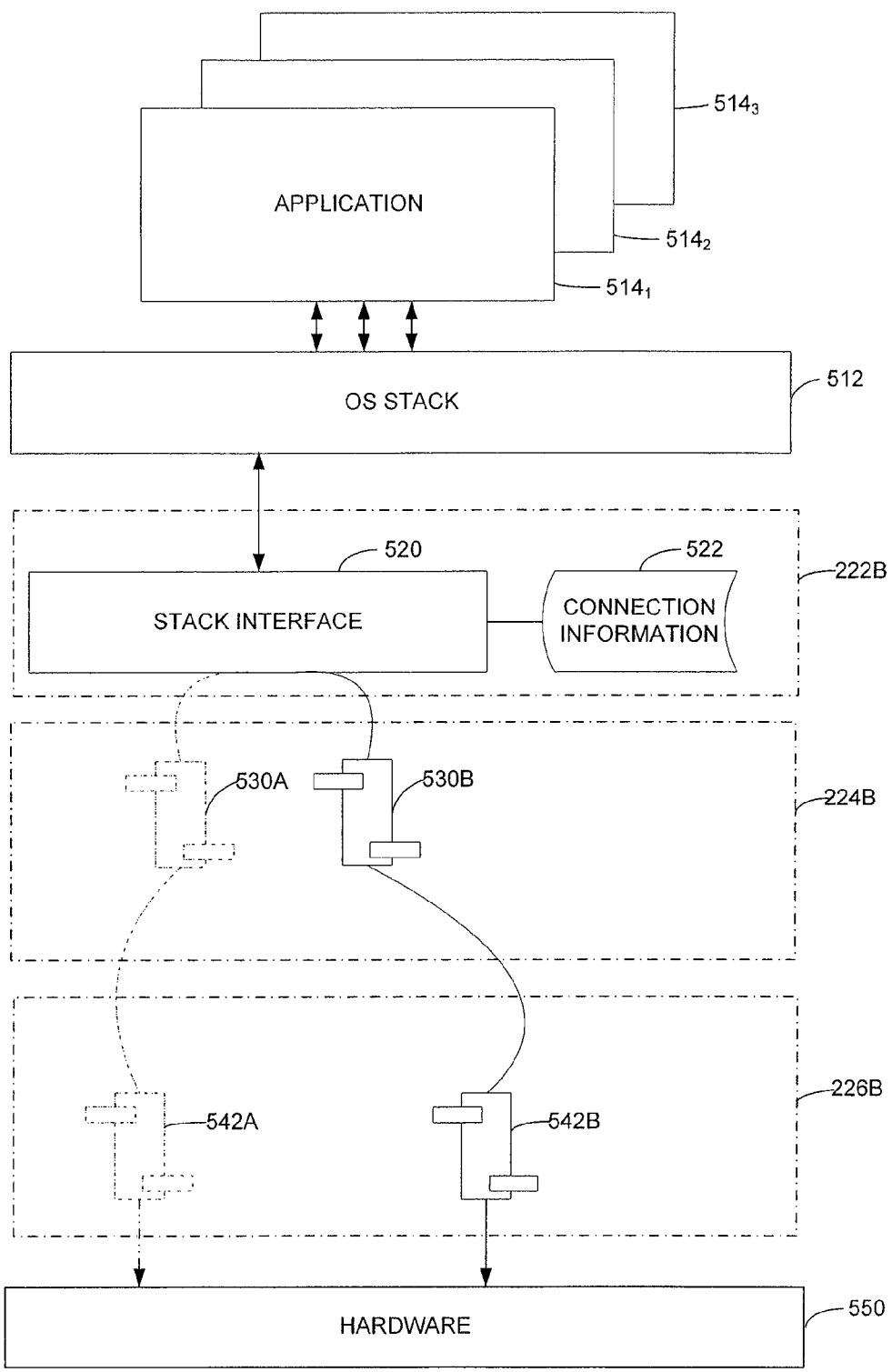
FIG. 5B is a sketch of a computing device of FIG. 5A in an alternative configuration.

FIG. 5B shows an alternative operating sequence in which two wireless technologies are supported sequentially. As in the example of FIG. 5A, FIG. 5B shows applications $514_1 \ldots 514_3$ communicating wirelessly through operating system stack 512. Operating system stack 512 interfaces with stack interface module component 520 within packet processing security module 222B. To the extent information is maintained about the connections that applications $514_1 \ldots 514_3$ have formed using a wireless technology with other components in other devices, that information may be maintained in connection information component 522.

At a first time, the software defined radio illustrated in FIG. 5B may be configured to communicate using a first wireless technology. To support communication with a first wireless technology, MAC processes module 224B may be configured, at the first time, with a component 530A. Likewise, baseband processes module 226B may be configured with component 542A to support wireless communication using the first wireless technology.

At some later time, the radio may be reconfigured for operation according to a second wireless technology. The reconfiguration may be made for any suitable reason. For example, cognitive module 252 (FIG. 2) may detect a source of interference disrupting communications according to the first wireless technology. In response, configuration logic module 242 (FIG. 2) may reconfigure the software defined radio for communication using a second wireless technology. This reconfiguration may be achieved, for example, by configuring MAC processes module 224B with component 530B and reconfiguring baseband processes module 226B with component 542B. Accordingly, at the second instance of time, communication may be achieved using the second wireless technology.

FIG. 5B illustrates that in switching from the first wireless technology to the second wireless technology, the operation of some of the modules within data plane 220 (FIG. 2) changes. However, packet processing and security module 222B was not reconfigured. Connection information maintained within connection information component 522 was not changed as a result of the reconfiguration. Accordingly, though the software defined radio communicates using a different wireless technology, any connections established by applications $514_1 \ldots 514_3$ may be maintained.

Regardless of whether established connections are maintained when the software defined radio is reconfigured, a software defined radio as in the example of FIG. 2 may be controlled to adapt to conditions detected during communications. In the example of FIG. 2, cognitive module 252 may monitor conditions to detect events that indicate a reconfiguration of the software defined radio may be desirable. In response to an event indicating reconfiguration of the software defined radio, profile manager 248 may provide or be requested to provide a wireless technology specification to configuration logic 242, causing the data plane 220 to be reconfigured.

The wireless technology specification used to reconfigure the software defined radio may be selected in any suitable way. However, in some embodiments of the invention, computing devices with configurable radios, such as the software defined radio pictured in FIG. 2, may negotiate a set of configurations and conditions under which each configuration in the set is to be used. Upon detection of an event indicating reconfiguration, an appropriate configuration may be selected from the set. Because the communicating computing devices have negotiated, the sets of configuration in the communicating computers may be compatible. Further, the communicating computers may have a mechanism to share information about events, such that each communicating computer may concurrently recognize an event triggering reconfiguration.

In response, each may select a configuration from their set. Because the sets are compatible and the time at which the configuration are applied is coordinated, the communicating computers may remain able to communicate even though the computers reconfigure as a result of conditions detected during communication.

Figure 6A:
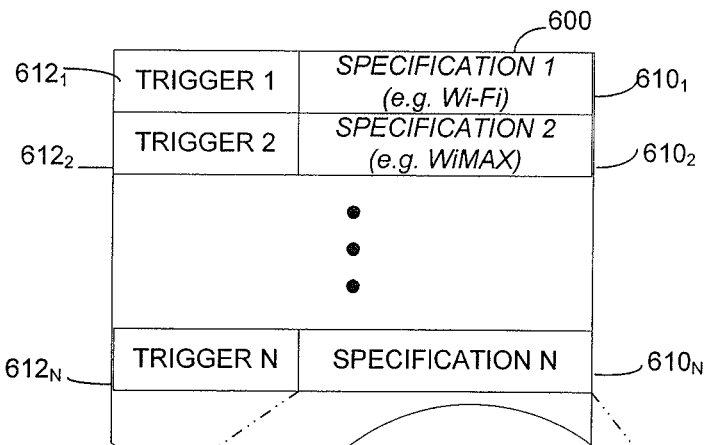
FIG. 6A is a sketch of a data structure for a set of configurations that may be stored in a computing device according to an embodiment of the invention.

The sets of configurations may be maintained by each communicating computer in any suitable form. FIG. 6A provides an example of a data structure 600 that may be maintained by each communicating computer. Data structure 600 may store information similar to that stored in data structure 300 (FIG. 3) and may be maintained by a computer instead of or in addition to a data structure 300. In the example of FIG. 6A, data structure 600 contains multiple wireless technology specifications $610_1, 610_2 \ldots 610_N$. Though any suitable form may be used for each of the wireless technology specifications, the wireless technology specification $610_1, 610_2 \ldots 610_N$ may be in the same form as specifications $310_1, 310_2 \ldots 310_N$ (FIG. 3). Each of the wireless technology specifications $610_1, 610_2 \ldots 610_N$ may be used to configure a software defined radio.

Data structure 600 additionally may include information defining when each of the specifications $610_1, 610_2 \ldots 610_N$ is to be used to configure the software defined radio. The times at which each specification is to be used may be recorded in any suitable format. In the embodiment illustrated in FIG. 6A, time of use information may be specified by specifying configuration transition information associated with each of the specifications. The configuration transition information may indicate a time at which the software defined radio is to be reconfigured according to a specific wireless technology specification. Time may be indicated in any suitable way, such as relative to a clock shared by the communicating computers or relative to an event or combination of events.

In the example of FIG. 6A, configuration transition information is illustrated by trigger information $612_1, 612_2 \ldots 612_N$. Trigger information associated with each wireless technology specification may identify an event or events that trigger a reconfiguration of the software defined radio. For a software defined radio implemented as illustrated in FIG. 2, the trigger events stored in data structure 600 may be used by cognitive module 252 to identify when to signal a reconfiguration of data plane 220. Additionally, trigger information $612_1, 612_2 \ldots 612_N$, because each is associated with a wireless technology specification, may also identify the specification to use when the trigger events are detected.

Figure 6B:
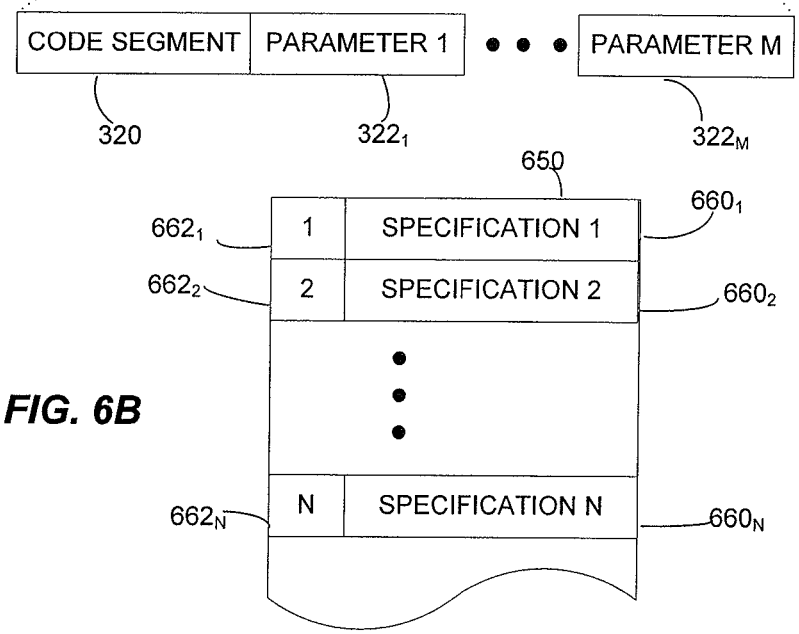
FIG. 6B is a sketch of a set of configurations according to an alternative embodiment of the invention.

FIG. 6A illustrates an example of a data structure that may be used to store a set of configurations negotiated between two or more communicating computers. A set of configurations may be stored within the computing device in any suitable way. FIG. 6B provides another example of a data structure that may store a set of configurations. Data structure 650 contains multiple wireless technology specifications $660_1, 660_2 \ldots 660_N$. The wireless technology specifications in data structure 650 may be stored in any suitable form, including the format used to store wireless technology specifications in data structure 300 (FIG. 3) or in data structure 600 (FIG. 6A). Data structure 650 differs from data structure 600 in the manner in which configuration transition information is stored. In the embodiment illustrated in FIG. 6A, configuration transition information is defined by information identifying one or more events intended to cause a change in radio configuration. In contrast, in the embodiment of FIG. 6B, data structure 650 includes a structure that orders the wireless technology specifications $660_1, 660_2 \ldots 660_N$. In this embodiment, the wireless technology specifications $660_1, $660_2 \ldots 660_N$ are applied in the defined order as events indicating a change in configuration occur.

The wireless technology specifications within data structure 650 are ordered by values in field $662_1$, $662_2 \ldots 662_N$. However, any suitable mechanism may be used to indicate an order for wireless technology specifications $660_1$, $660_2 \ldots 660_N$, including simply by the arrangement of data as it is stored in memory within data structure 650.

Data structure 650 may support reconfigurations in response to any suitable type of event. As an example, data structure 650 may be used to support reconfigurations in response to errors, allowing the software defined radio to adapt to conditions that occur during communication. To support adaptation, data structure 650 may contain wireless technology specifications that define configurations in an order in which they may be tried by two or more communicating computers to adapt to errors or other problems that occur while they are communicating.

As a specific example, one or more of the wireless technology specifications within data structure 650 may configure a software defined radio to communicate according to a particular wireless technology with successively decreasing data rates. Such a pattern of wireless technology specifications within data structure 650 may be useful to implement rate adaptation in response to error conditions.

Alternatively or additionally, data structure 650 may contain a pattern of wireless technology specifications that configure the software defined radio for operation in which other types of adaptation occurs as the wireless technology specifications are applied in turn. For example, a sequence of wireless technology specifications may specify successively increasing transmit power levels. If the software defined radio is reconfigured with a new configuration from data structure 650 in response to error conditions, such a pattern of wireless technology specifications may cause the software defined radio to adapt to error conditions by increasing its power level.

The types of adaptations that may be performed by specifying a set of configurations and conditions under which they are used is not limited to adaptations based on data rate or power level. Any suitable parameter may be varied. Further, because the set of wireless technology specifications may define different configurations for the same wireless technology or may define different wireless technologies, adaptations that result from selecting configurations from a set of configurations may cause adaptations within a wireless technology specification or may cause adaptations by switching wireless technologies. As a specific example, FIG. 6A illustrates wireless technology specification $610_1$ that may configure a software defined radio to communicate according to the Wi-Fi protocol. In contrast, wireless technology specification $610_2$ may configure a software defined radio to communicate according to the WiMAX protocol. Upon the occurrence of the events defined by trigger information $612_1$, the software defined radio may be configured to communicate according to Wi-Fi. If that protocol does not adequately support communication between two computing devices, the conditions defined by trigger information $612_2$ may occur. In that scenario, the software defined radio may be reconfigured with wireless technology specification $610_2$ to communicate according to the WiMAX protocol.

Regardless of the specific wireless technology specifications used within the set of configurations and the mechanism used to identify a configuration transition, embodiments of the invention may entail providing consistent sets of configurations to each of two or more computing devices communicating wirelessly. Each device with such a set of configurations may also include a mechanism to identify trigger events to cause the reconfiguration of a software defined radio according to the consistent set of configurations. In this way, each of the communicating devices may maintain compatible configurations such that the devices may maintain communication even as the devices reconfigure in response to detected events.

Any suitable mechanism may be used by the communicating devices to detect events. For example, each device may separately monitor parameters associated with communication between the devices and separately identify the trigger events. Such an embodiment may be useful in a scenario in which communication according to a wireless technology specification is suddenly disrupted. Each of the communicating devices may independently detect this event and reconfigure in accordance with the pre-negotiated set of configurations. Each of the communicating devices may reconfigure until the devices are configured for communication according to a wireless technology over which communication can be supported.

As another example, communicating devices may each identify a trigger event based on communication between the devices. Such a capability may be useful in a scenario in which one of the communicating devices identifies a trigger event. For example, one of the communicating devices may identify that a lower power configuration is desirable because its battery is low on charge. That device may communicate to other devices to switch to a lower power configuration. The message from one communicating device to another may be a trigger event associated with the compatible set of configurations that has been negotiated by the communicating devices.

Figure 7:
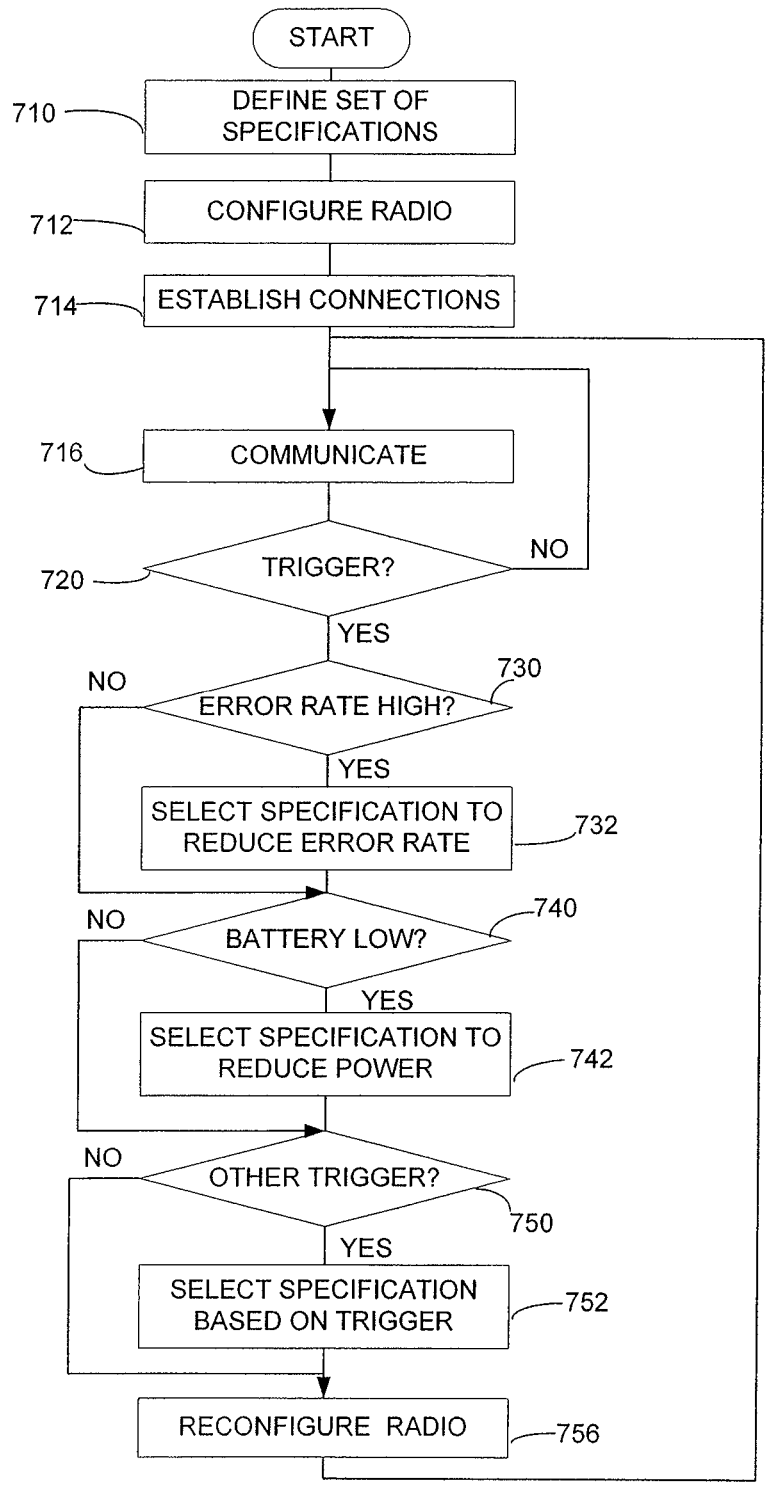
FIG. 7 is a flowchart of a process by which a computing device may change configurations according to an embodiment of the invention.

Regardless of how the configuration transition information is identified by each computing device, each communicating device may operate according to a process by which the radio is reconfigured based on configuration information in the compatible set of configurations as events occur during operation of the devices. FIG. 7 illustrates such a process.

The process begins at block 610 where one or more communicating devices defines a set of wireless technology specifications. The process illustrated in FIG. 7 may be performed within each of the communicating devices. Accordingly, each of the communicating devices will define a set of specifications. Each device may define a set of specifications in any suitable way. In some embodiments, each of the communicating devices will define a set of specifications that contains the same specifications and configuration transition information. However, the sets of specifications defined by each of the communicating devices may be compatible without being the same. For example, some protocols contain optional elements that are ignored by devices that do not support those elements. The protocol may be defined in a way that allows devices, some that support optional elements of the protocol and some that do not, to communicate effectively with those that do not. In that scenario, two communicating devices may be regarded to have a compatible set of configurations if each will be configured with a specification that supports communication with the other, even if the configurations are not identical.

Regardless of how the set of specifications is defined at block 710, the process may proceed to block 712. At block 712, each of the communicating devices may configure its radio based on the set of specifications defined at block 710. For example, one configuration in the set of configurations defined at block 710 may specify an initial configuration. At block 712, each of the communicating devices may configure its radio with the initial configuration defined in the set at block 710.

The process may then proceed to block 714. Because the communicating devices are configured with compatible configurations, the devices may communicate. At block 714, one or more connections may be established between the devices. Connections may be established using the transmission control protocol (TCP) or any other suitable protocol.

Once a connection is established, the process may continue to block 716 where the devices communicate using the established connections. Communications may continue as long as no trigger event occurs. Accordingly, the process branches from decision block 720 to block 716.

Conversely, if a trigger event occurs, the process may branch from decision block 720 to decision block 730. In the embodiment illustrated, the communicating devices employ a mechanism that allows each device to detect the trigger event.

Processing that follows a branch from decision block 720 to decision block 730 may entail changing a configuration in response to the trigger event. Each of the communicating devices may perform the same processing to ensure that the configurations of the devices remain compatible even after the trigger event.

Any suitable processing may be performed in response to the detection of a trigger event, and that processing may depend on the nature of the trigger event. In the embodiment illustrated in FIG. 7, different processing may be performed based on whether the trigger event indicates a high error rate, one of the devices has low battery charge or other condition of interest has occurred. Accordingly, FIG. 7 shows that processing branches at decision block 730 based on whether the trigger event indicates that a high error rate has been detected.

Any suitable mechanism may be used as an indication of a high error rate. The error rate may be based on a bit error rate or a packet error rate or any other suitable measure of error. Also, any suitable threshold or other criteria may be used to identify an error rate that is too high. In the embodiment illustrated, the criteria applied at decision block 730 may be based on trigger information $612_1, 612_2 \ldots 612_N$ stored in a data structure defining a set of configurations. Regardless of how a high error rate is defined, if the trigger event detected at block 720 was caused by such a high error rate, processing may branch from decision block 730 to decision block 732. At block 732, a wireless technology specification associated with trigger information indicating a high error rate may be selected. Conversely, if the trigger event detected at decision block 720 is not associated with a high error rate, the process may branch from decision block 730 to decision block 740.

At decision block 740, a check may be made of whether the trigger event detected at decision block 720 is associated with a low battery. If the event is associated with a low battery, the process may proceed to block 742 where a wireless technology specification associated with a low battery is selected. In an embodiment in which a data structure 600 is used, selecting a specification at block 642 may entail identifying the wireless technology specification associated with a trigger event indicating a low battery.

Conversely, if the trigger event is not associated with a low battery, processing may branch from decision block 740 to decision block 750. The process illustrated in FIG. 7 may entail selecting a configuration based on any suitable number of configurations. In the example of FIG. 7, however, only three such types of trigger events are illustrated. Accordingly, if the trigger event is any other than a high error rate or a low battery, processing proceeds to block 752 where a wireless technology specification is selected based on the trigger event. Conversely, the process branches from decision block 750 to block 756.

Regardless of the path by which processing reaches block 756, when processing reaches block 756, a wireless technology specification has been selected at one of block 732, 742 or 752, with a specific specification selected based on the nature of the trigger event detected. Regardless of the specification selected, at block 756 that specification is used to reconfigure the software defined radio. The process then may loop back to block 716 where the device is continued to communicate. Because each of the communicating devices is reconfigured based on a compatible set of configurations, following processing at block 756, the communicating devices may continue to communicate.

The foregoing process steps provide an example of how a trigger may be defined and used. Triggers can be defined to make an adaptation to respond to a trigger event within the same wireless technology without reconfiguring the software defined radio specification. For example, in 802.11, a high data error rate can be handled by rate adaptation, and a low battery can be handle by enabling power saving mode. In these scenarios, reconfiguring at block 756 may entail specifying a different operating parameter for components that have already been configured. However, when an event occurs that cannot be solved within a particular radio specification or can be handled better by switching radio specifications, reconfiguring at block 756 may entail reconfiguring the specification for the software defined radio.

In the embodiment illustrated, processing at block 714 to establish connections is not repeated, though in other embodiments, connections may be re-established following reconfigurations. However, as described above in connection with FIG. 5B, a software defined radio having the architecture of FIG. 2 may be reconfigured without disruption of connections. Accordingly, FIG. 7 illustrates a scenario in which communicating devices may adapt to conditions that disrupt communications without having connections disrupted.

The process of FIG. 7 may be performed regardless of how consistent sets of specifications are defined at block 710. However, in some embodiments, the compatible sets of configurations are defined by negotiations between communicating devices. Negotiations may entail exchanges of information between the devices or may entail one device transmitting configuration information to the other. Alternatively, the "negotiation" may entail the communicating devices obtaining sets of configuration information from a mutually accepted source. Though such negotiations may be performed in any suitable way, FIG. 8 illustrates as an example a process of negotiation that may occur between two computing devices with configurable radios.

Figure 8:
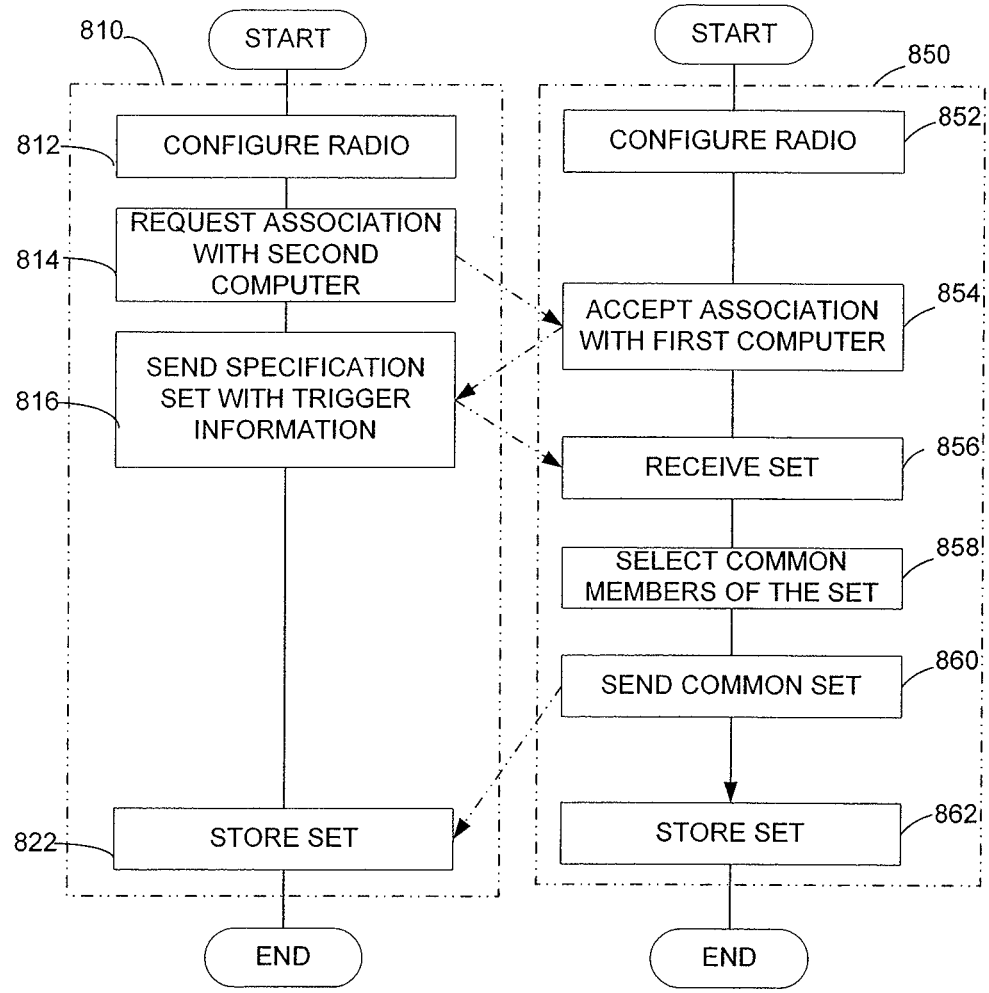
FIG. 8 is a flowchart of a process by which two computing devices may negotiate a set of configurations for coordinating communication according to an embodiment of the invention.

FIG. 8 illustrates sub-processes 810 and 850. In the example illustrated, sub-process 810 may be performed on a first communicating device and sub-process 850 may be performed on a second communicating device.

As illustrated, each of the sub-processes 810 and 850 begins with each device configuring a radio. A radio in the first device may be configured by processing at block 812 and the radio in the second device may be configured by processing at block 852. The initial configuration performed at blocks 812 and 852 may be performed in any suitable way. For example, each device may be initially configured according to a well known standard using default configuration parameters.

Regardless of how radios in the devices are initially configured, one device may initiate communication with the other device. In the example of FIG. 8, the first computer, at block 814, initiates communication with the second computer. In the embodiment illustrated, processing at block 814 entails the first computer sending a request for an association to the second computer.

The second computer, at block 854 accepts the association with the first computer. The format for requesting the association at block 814 and accepting the association at block 854 may be specified by the protocol with which the computers are configured at blocks 812 and 852. However, the specific format of messages exchanged between the computers is not critical to the invention and any suitable format may be used.

Once the first computer receives an indication that the second computer has accepted the association request, the first computer may perform processing at block 816. At block 816, the first computer may send a proposed set of specifications with associated trigger information to the second computer. The proposed set of specifications may be transmitted in any suitable form. As one example, a data structure, such as data structure 600, may be sent as a file from the first computer to the second computer using a defined file transfer format.

Regardless of how the proposed set of specifications is transmitted, the second computer may receive the set at block 856. Processing on the second computer may then proceed to block 858. At block 858, the second computer may identify common members of the proposed set. The second computer may select common members of the set based both on the configurations it can support and the types of trigger events it can identify.

Regardless of how the common members of the set are identified, sub-process 850 may continue to block 860 where the second computer sends the common set to the first computer. Within sub-process 810, processing may proceed to block 822. Within sub-process 850 on the second computer, processing may proceed to block 862. At blocks 822 and 862, the first and second computers, respectively, may store the agreed common set. In this way, both the first computer and the second computer will have stored a compatible set of configurations and trigger information that may be used for subsequent reconfiguration as a trigger events are detected.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a first computing device having a configurable radio, the method comprising:
   defining a plurality of configurations for communicating with a second computing device, wherein the defining comprises:
      pre-negotiating with the second computing device, based on trigger detection capabilities of the first computing device:
         the plurality of configurations, and
         at least one trigger for each configuration of the plurality of configurations,
      wherein the pre-negotiating includes receiving data from a server and/or from the second computing device, the data including:
         a proposed set of configurations; and
         at least one trigger for each configuration of the proposed set of configurations;
   communicating with the second computing device via the configurable radio while the configurable radio is configured with a first configuration of the pre-negotiated plurality of configurations;
   in response to detection of the at least one trigger for a second configuration of the pre-negotiated plurality of configurations, configuring the configurable radio with the second configuration; and
   communicating with the second computing device via the configurable radio while the configurable radio is configured with the second configuration,
   wherein the pre-negotiated plurality of configurations are defined before detection of the at least one trigger for the second configuration.

2. The method of claim 1, wherein the pre-negotiated plurality of configurations are configurations that are associated with triggers detectable by the second computing device.

3. The method of claim 1, wherein each of the at least one trigger for each configuration of the plurality of configurations comprises a definition of a trigger event following which a configuration associated with that at least one trigger is to be employed.

4. The method of claim 1, wherein receiving the data comprises:
   downloading the proposed set of configurations from the server.

5. The method of claim 1, wherein receiving the data comprises:
   receiving a file containing the proposed set of configurations from the second computing device.

6. The method of claim 1, further comprising:
   detecting the at least one trigger for the second configuration of the pre-negotiated plurality of configurations, the detecting comprising:
      detecting an error rate above a threshold, the error rate being associated with communications between the first computing device and the second computing device.

7. The method of claim 1, further comprising:
   detecting the at least one trigger for the second configuration of the pre-negotiated plurality of configurations, the detecting comprising:
      receiving an indication of a charge level of a battery of the first computing device or the second computing device.

8. The method of claim 1, wherein communicating with the second computing device while the configurable radio is configured with the second configuration comprises communicating with a different communications protocol than used during the communicating with the second computing device while the configurable radio is configured with the first configuration.

9. The method of claim 1, wherein communicating with the second computing device while the configurable radio is configured with the second configuration comprises communicating with the same communications protocol and with a different data rate than used during the communicating with the second computing device while the configurable radio is configured with the first configuration.

10. A computer storage memory having stored therein:
    a data structure storing configuration transition information; and
    computer-executable instructions that, when executed on a first computing device having a configurable radio, control the first computing device to perform operations comprising:
       pre-negotiating a plurality of configurations and configuration transition information for communicating with a second computing device based on abilities of the first and second computing devices to detect potential conditions for transitioning to each configuration of the plurality of configurations, wherein the pre-negotiating comprises:
          receiving data from a server and/or from the second computing device, the data including:
             a proposed set of configurations; and
             conditions for transitioning to each configuration of the proposed set of configurations
          pre-negotiating, with the second computing device, the plurality of configurations;
          pre-negotiating, with the second computing device, the configuration transition information, wherein the configuration transition information defines conditions for transitioning to each configuration of the plurality of configurations; and storing the pre-negotiated plurality of configurations and the pre-negotiated configuration transition information in the data structure;

communicating with the second computing device via the configurable radio;

detecting a trigger event, after the pre-negotiation of the plurality of configurations;

in response to the detected trigger event, selecting a configuration from the pre-negotiated plurality of configurations based on the configuration transition information;

applying the selected configuration to the configurable radio; and further communicating with the second computing device via the configurable radio configured with the selected configuration.

11. The computer storage memory of claim 10, wherein the operations further include:

maintaining the data structure by storing, for a first configuration of the pre-negotiated plurality of configurations, computer-executable instructions that, when executed, configure a component of the configurable radio according to the first configuration.

12. The computer storage memory of claim 11, wherein the operations further include:

maintaining the data structure by storing, for each of the pre-negotiated plurality of configurations, a value of a parameter of operation of a component of the configurable radio.

13. The computer storage memory of claim 10, wherein:

the configuration transition information comprises an identification of trigger events for each of the pre-negotiated plurality of configurations; and selecting the configuration comprises:

selecting a configuration from the data structure, the selected configuration having configuration transition information associated therewith that identifies the detected trigger event.

14. A method of operating a first computing device having a configurable radio, the method comprising:

while the configurable radio is configured with a first configuration, establishing a connection between a data generating or consuming component on the first computing device and a data generating or consuming component on a second computing device, the connection using the configurable radio to transmit and receive data in packets formatted for the connection;

pre-negotiating at least a second configuration for communicating with the second computing device, wherein the pre-negotiating at least the second configuration comprises:

receiving data from a server and/or from the second computing device, the data including:

a proposed set of configurations; and at least one trigger associated with each configuration of the proposed set of configurations; and negotiating at least the second configuration with the second computing device;

detecting, by the first computing device, an occurrence of the at least one trigger associated with the second configuration;

in response to the detection of the at least one trigger associated with the second configuration, reconfiguring the configurable radio with the second configuration, wherein the second configuration conforms to a configuration to be used by the second computing device in response to detection of the at least one trigger; and while the configurable radio is configured with the second configuration, continuing to communicate data over the connection.

15. The method of claim 14, wherein:

the configurable radio comprises a software defined radio having a packet processing component implemented as a plurality of computer-executable instructions, and reconfiguring the configurable radio with the second configuration comprises reconfiguring portions of the configurable radio without altering the function of the packet processing component.

16. The method of claim 14, wherein:

establishing the connection comprises:

establishing a TCP connection using a first wireless communications protocol; and continuing to communicate data over the connection comprises:

communicating using a TCP protocol using a second wireless communications protocol.

17. The method of claim 16, wherein the first wireless communications protocol is Wi-Fi and the second wireless communications protocol is WiMAX.

* * * * *